(12) United States Patent
Tawa (10) Patent No.: US 7,449,278 B2
(45) Date of Patent: Nov. 11, 2008

(54) MULTILAYER OPTICAL RECORDING MEDIUM AND STORAGE DEVICE

(75) Inventor: Fumihiro Tawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 10/974,162

(22) Filed: Oct. 27, 2004

(65) Prior Publication Data

US 2005/0084800 A1  Apr. 21, 2005

Related U.S. Application Data

(63) Continuation of application No. PCT/JP02/07210, filed on Jul. 16, 2002.

(51) Int. Cl.
*G11B 7/24* (2006.01)
*G11B 7/00* (2006.01)
*G03C 11/00* (2006.01)

(52) U.S. Cl. .......... 430/270.11; 430/945; 428/64.4; 369/284; 369/288; 369/112.02; 369/94

(58) Field of Classification Search .............. None
See application file for complete search history.

(56) References Cited

U.S. PATENT DOCUMENTS

| | | | | |
|---|---|---|---|---|
| 4,360,908 | A | * | 11/1982 | Howe et al. ........... 369/109.01 |
| 5,093,821 | A | * | 3/1992 | Katayama et al. ...... 369/112.17 |
| 5,233,582 | A | * | 8/1993 | Tanno et al. ............. 369/44.23 |
| 5,268,862 | A | | 12/1993 | Rentzepis |
| 5,325,324 | A | | 6/1994 | Rentzepis et al. |
| 5,768,221 | A | * | 6/1998 | Kasami et al. ................. 369/14 |
| 6,069,860 | A | * | 5/2000 | Mizuno et al. ......... 369/112.26 |
| 6,226,258 | B1 | * | 5/2001 | Tominaga et al. ........... 369/283 |

(Continued)

FOREIGN PATENT DOCUMENTS

JP  61-203450  *  9/1986

(Continued)

OTHER PUBLICATIONS

Translation of JP 2001-184641 (aka 13-184641).*

*Primary Examiner*—Martin J Angebranndt
(74) *Attorney, Agent, or Firm*—Greer, Burns & Crain, Ltd.

(57) ABSTRACT

A multilayer optical recording medium including a first recording layer for recording or reproducing information by using a first light beam having a center wavelength $\lambda 1$, a first photochromic layer provided on the first recording layer, and a first optical waveguide layer provided on the first photochromic layer for guiding to the first photochromic layer a second light beam having a center wavelength $\lambda 2$ different from the center wavelength $\lambda 1$. The multilayer optical recording medium further includes a second recording layer provided on the first optical waveguide layer for recording or reproducing information by using the first light beam, a second photochromic layer provided on the second recording layer, and a second optical waveguide layer provided on the second photochromic layer for guiding the second light beam to the second photochromic layer. The first and second photochromic layers become transparent to the first light beam by irradiation with light or by application of heat. The reflectance of each of the first and second photochromic layers to the first light beam can be repeatedly increased by irradiation with the second light beam and can be repeatedly decrease to restore the transparent state.

13 Claims, 8 Drawing Sheets

INNER CIRCUMFERENTIAL SIDE OF THE MEDIUM

OUTER CIRCUMFERENTIAL SIDE OF THE MEDIUM

U.S. PATENT DOCUMENTS

| | | | |
|---|---|---|---|
| 6,280,904 B1 * | 8/2001 | Sokoluk et al. | 430/270.15 |
| 6,418,108 B1 * | 7/2002 | Ueda et al. | 369/112.23 |
| 6,556,531 B1 * | 4/2003 | Yagi et al. | 369/103 |
| 6,628,593 B1 * | 9/2003 | Yamashita et al. | 369/53.22 |
| 6,729,541 B1 * | 5/2004 | Kurokawa et al. | 235/454 |
| 2002/0154582 A1 * | 10/2002 | Yonezawa et al. | 369/44.27 |
| 2003/0137706 A1 * | 7/2003 | Rmanujam et al. | 359/34 |
| 2005/0135218 A1 * | 6/2005 | Akiyama et al. | 369/112.02 |

FOREIGN PATENT DOCUMENTS

| | | | |
|---|---|---|---|
| JP | 63-142546 | * | 6/1988 |
| JP | 3-125349 | | 5/1991 |
| JP | 07-319108 | * | 12/1995 |
| JP | 8-096406 | | 4/1996 |
| JP | 8-315413 | | 11/1996 |
| JP | 9-106034 | | 4/1997 |
| JP | 11-345419 | | 12/1999 |
| JP | 2000-149318 | | 5/2000 |
| JP | 2000-149323 | | 5/2000 |
| JP | 2001-014725 | | 1/2001 |
| JP | 2001-184641 | * | 7/2001 |
| WO | 99/23650 | * | 5/1999 |

* cited by examiner

FIG.1

INNER CIRCUMFERENTIAL SIDE OF THE MEDIUM

OUTER CIRCUMFERENTIAL SIDE OF THE MEDIUM

MULTILAYER OPTICAL RECORDING MEDIUM AND STORAGE DEVICE

This is a continuation of International PCT Application NO. PCT/JP02/07210, filed Jul. 16, 2002, which was not published in English.

BACKGROUND OF THE INVENTION

1. Field of the Invention

The present invention relates to a multilayer optical recording medium and a storage device for recording or reproducing information to or from the recording medium.

2. Description of the Related Art

A compact disc (CD) has one recording layer, and information recorded on the recording layer is read from reflected light of a light beam directed from one side of the disc. Further, a digital versatile disc-ROM (DVD-ROM) having an increased recording capacity over the CD includes a standard having two recording layers, and information is read from these two recording layers by optimizing the reflectances and transmittances of the two recording layers. This dual-layer recording method has an advantage such that information can be read from the two recording layers by using a short-wavelength laser without changing a conventional optical system.

To further increase the recording capacity in the future, research on reading of information from a recording medium having multiple recording layers is being conducted. Regarding DVD media, research on a recording medium having three or more recording layers is being conducted. For example, a write-once medium having four recording layers is reported in Optical Data Storage Symposium ODS2001-Lecture No. MC5. The method described in this report is a method for reading information from each recording layer by optimizing the transmittance and reflectance of each recording layer. Thus, multilayering of recording layers is effective in increasing the recording capacity.

However, all the DVD media now in practical use are media having two recording layers for each, and no media having three or more recording layers for each have been put into practical use. In reading information from each recording layer by using a conventional optical head, a sufficient reflected light quantity is required. Further, to read information from a deeper recording layer, a transmitted light quantity must also be increased. As a result, the light quantity reflected on a desired recording layer relative to the light quantity reflected on each recording layer is reduced more with an increase in the number of recording layers, causing a reduction in S/N in reading information. Further, information read from the recording layers other than the desired recording layer is mixed with the reflected light from the desired recording layer, so that information processing for identifying information read from the desired recording layer may become more difficult. Accordingly, while the recording medium having four recording layers is reported in Optical Data Storage Symposium as mentioned above, it is considered that a recording medium having five or more recording layers is difficult to produce.

In the above-mentioned DVD media, information recorded on each recording layer is read by optimizing the transmittance and reflectance of each recording layer. Other information reading methods have been proposed. For example, U.S. Pat. No. 6,009,065 discloses a method of utilizing fluorescent emission at a focal position to identify a desired recording layer from information on the fluorescent emission. This method uses a recording medium having several stacked recording layers formed of a fluorescent chemical substance. This method utilizes a phenomenon such that the fluorescent chemical substance generates scattered light having a wavelength different from the wavelength of an incident laser beam at only the focal position, and information recorded on the desired recording layer is read at the intensity of this scattered light. This fluorescent chemical substance is normally transparent, so that it has an advantage such that a reduction in light quantity can be suppressed even with an increase in the number of recording layers.

In this patent, the focal position must be moved to near the desired recording layer, for example, to select the desired recording layer. However, due to variations in thickness of the recording medium or due to waviness of the recording medium, for example, it is impossible to optically identify whether the focal position is reliably brought to the desired recording layer. Accordingly, it is necessary to perform a fine adjusting operation such that the desired recording layer is identified from address information included in the fluorescent light to bring the focal position to the desired recording layer. It is also necessary to perform an operation for checking whether the data information obtained is originated from only the desired recording layer. It is therefore considered that there is a limit to speed enhancement for information retrieval.

As another conventional recording medium, U.S. Pat. No. 6,005,838 discloses a recording medium having recording layers responding to various combinations obtained by changing the wavelength or polarization direction of a light source for reading information. This patent uses a cholesteric compound capable of transmitting most light and reflecting light having a specific wavelength and polarization direction. This method has an advantage such that by stacking a plurality of recording layers different in reflection wavelength or polarization direction, a desired recording layer can be selected by changing the wavelength or polarization direction, thereby allowing an increase in recording capacity. However, many light sources having different wavelengths are required as compared with a conventional optical system, and a spectral mechanism for separating information according to wavelengths or a mechanism for switching the polarization direction is also required, thus causing an increase in cost and size of a recording device.

As another conventional storage, there is a wavelength multiplexing, multilayer recording type hologram memory using a photochromic material. For example, Japanese Patent Laid-open No. Hei 9-101735 discloses a device for reproducing information by utilizing an optical recording medium having layers of an optical waveguide and a photochromic material, introducing reference light from the optical waveguide to the photochromic material in which information is recorded, and using reconstructed light obtained by modulating the wavefront of the reference light.

The photochromic material is a material for applying a refractive index distribution by absorption of one photon or two photons. However, there has not yet been developed a photochromic material capable of maintaining modification of characteristics required as a recording medium at room temperature and having high resolution and optical reversibility. Even if such an ideal photochromic material is developed as an information recording material, information cannot be recorded or reproduced by using a conventional recording/reproducing device. In recording information, light beams from at least two light sources must be directed accurately to the medium; otherwise interference fringes are moved to cause a reduction in contrast. Because of wobbling due to eccentricity or vibrations of an optical disk medium, it is difficult to adopt such a recording medium using a photochromic material.

SUMMARY OF THE INVENTION

It is therefore an object of the present invention to provide a multilayer optical recording medium having a plurality of recording layers wherein a desired one of these recording layers can be easily identified irrespective of the number of layers, and a reduction in S/N in reading information from the identified recording layer can be suppressed.

It is another object of the present invention to provide a recording/reproducing device which can record/reproduce information to/from an arbitrary one of recording layers in a multilayer optical recording medium and maintains compatibility with a conventional recording/reproducing device.

In accordance with an aspect of the present invention, there is provided a multilayer optical recording medium including a first recording layer for recording or reproducing information by using a first light beam having a center wavelength $\lambda 1$; a first photochromic layer provided on the first recording layer; a first optical waveguide layer provided on the first photochromic layer for guiding to the first photochromic layer a second light beam having a center wavelength $\lambda 2$ different from the center wavelength $\lambda 1$; a second recording layer provided on the first optical waveguide layer for recording or reproducing information by using the first light beam; a second photochromic layer provided on the second recording layer; and a second optical waveguide layer provided on the second photochromic layer for guiding the second light beam to the second photochromic layer; wherein the reflectance of each of the first and second photochromic layers to the first light beam can be repeatedly increased by irradiation with the second light beam and can be repeatedly decreased by stoppage of the irradiation.

Preferably, the refractive index n1 of each of the first and second optical waveguide layers, the refractive index n2 of each of the first and second recording layers, and the refractive index n3 of each of the first and second photochromic layers satisfy the relation of n3 >n1 >n2.

Each of the first and second optical waveguide layers has an inner circumferential end surface inclined to introduce the second light beam. Preferably, a first antireflection film capable of transmitting the first and second light beams is interposed between the first photochromic layer and the first optical waveguide layer. Similarly, a second antireflection film capable of transmitting the first and second light beams is interposed between the second photochromic layer and the second optical waveguide layer.

Preferably, a total reflection film capable of transmitting the first light beam and totally reflecting the second light beam is interposed between the first optical waveguide layer and the second recording layer. More preferably, the inner circumferential end surface of each of the first and second optical waveguide layers is formed with a plurality of gratings extending in the radial direction of the recording medium.

In accordance with another aspect of the present invention, there is provided a multilayer optical recording medium including a first recording layer for recording or reproducing information by using a first light beam having a center wavelength $\lambda 1$; a first photochromic layer provided on the first recording layer; a first optical waveguide layer provided on the first photochromic layer for guiding to the first photochromic layer a second light beam having a center wavelength $\lambda 2$ different from the center wavelength $\lambda 1$; a first antireflection film interposed between the first photochromic layer and the first optical waveguide layer for transmitting the first and second light beams; a second recording layer provided on the first optical waveguide layer for recording or reproducing information by using the first light beam; a total reflection film interposed between the first optical waveguide layer and the second recording layer for transmitting the first light beam and totally reflecting the second light beam; a second photochromic layer provided on the second recording layer; a second optical waveguide layer provided on the second photochromic layer for guiding the second light beam to the second photochromic layer; and a second antireflection film interposed between the second photochromic layer and the second optical waveguide layer for transmitting the first and second light beams; wherein the reflectance of each of the first and second photochromic layers to the first light beam can be repeatedly increased by irradiation with the second light beam and can be repeatedly decreased by stoppage of the irradiation.

In accordance with a further aspect of the present invention, there is provided a storage device for recording and/or reproducing information to/from a multilayer optical recording medium including a plurality of set structures each consisting of a recording layer, a photochromic layer, and an optical waveguide layer stacked in this order from the irradiation side of a light beam for recording/reproducing information, the storage device including a rotating mechanism for rotating the multilayer optical recording medium; a first optical head for directing a first light beam having a center wavelength $\lambda 1$ to the multilayer optical recording medium to record/reproduce information to/from an arbitrary one of the recording layers; and a second optical head for directing a second light beam having a center wavelength $\lambda 2$ different from the center wavelength $\lambda 1$ to a selected one of the optical waveguide layers; the first optical head being located in a region where the second light beam directed from the second optical head propagates in the selected optical waveguide layer.

The first optical head has a first objective lens for focusing the first light beam on the arbitrary recording layer, and the second optical head has a second objective lens for focusing the second light beam on the selected optical waveguide layer. The storage device further includes a first photodetector for detecting reflected light of the first light beam reflected on the photochromic layer whose reflectance has been increased by the second light beam propagating in the selected optical waveguide layer, a first focus error signal generating circuit for generating a focus error signal for the first objective lens according to an output from the first photodetector, and a first objective lens driving circuit for driving the first objective lens according to an output from the first focus error signal generating circuit.

Preferably, the storage device further includes a second photodetector for detecting reflected light of the second light beam, a second focus error signal generating circuit for generating a focus error signal for the second objective lens according to an output from the second photodetector, and a second objective lens driving circuit for driving the second objective lens according to an output from the second focus error signal generating circuit. The storage device further includes a third photodetector for detecting reflected light of the first light beam, an aberration correction signal generating circuit for generating an aberration correction signal for the first light beam according to an output from the third photodetector, an aberration correction element inserted in an optical path of the first light beam for correcting aberration of the first light beam, and an aberration correction element driving circuit for driving the aberration correction element according to an output from the aberration correction signal generating circuit.

Preferably, the storage device further includes a reflectance changing mechanism for reducing the increased reflectance of the photochromic layer attained by irradiation with the second light beam. This reflectance changing mechanism is effective in the case that the increased reflectance of the photochromic layer is not decreased in a short time after stopping the irradiation with the second light beam. For example, the reflectance changing mechanism includes a white LED as a light source.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
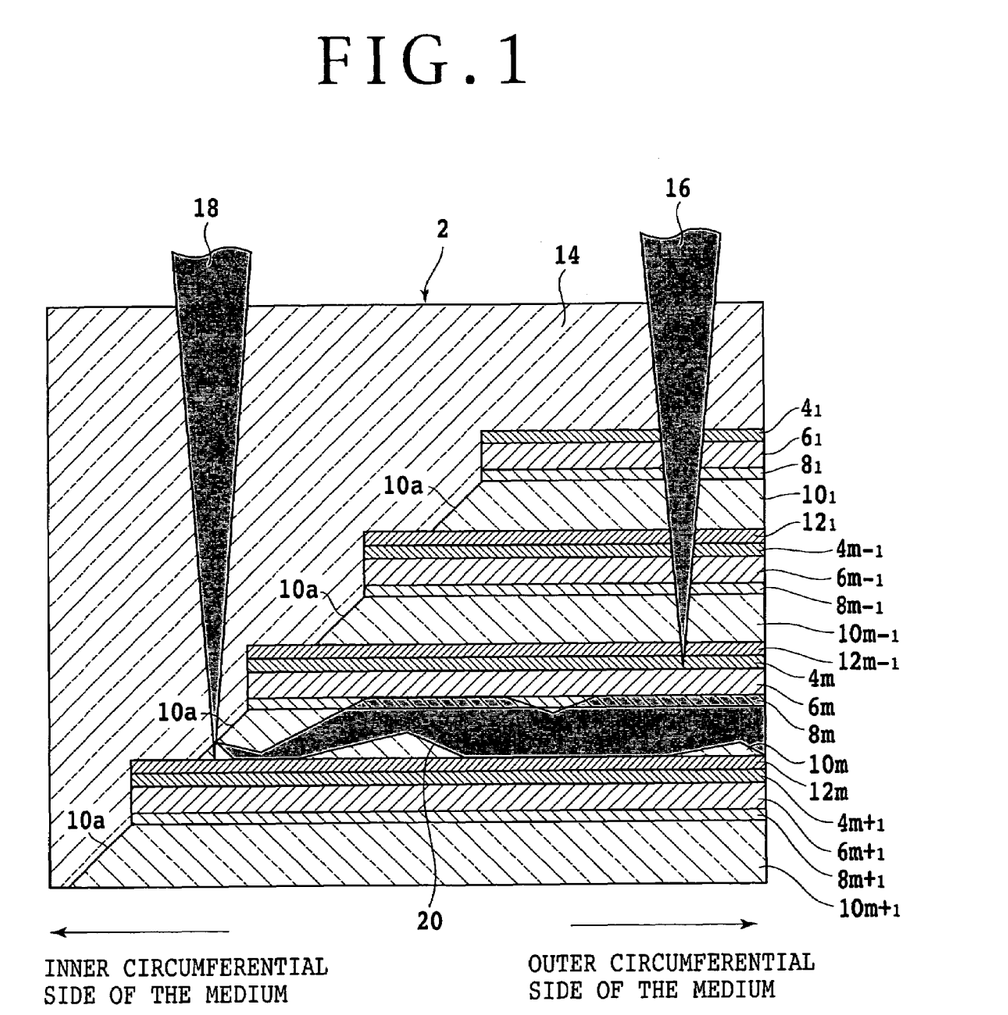
FIG. 1 is an enlarged sectional view of a multilayer optical recording medium according to a first preferred embodiment of the present invention.

Referring to FIG. 1, there is shown an enlarged sectional view of a multilayer optical recording medium according to a first preferred embodiment of the present invention. The multilayer optical recording medium includes a plurality of set structures each consisting of a recording layer 4, a photochromic layer 6, an antireflection film 8, an optical waveguide layer 10, and a total reflection film 12 stacked in this order from the irradiation side of a light beam 16 for recording/reproducing information. In FIG. 1, the first recording layer is denoted by $4_1$, the (m−1)-th recording layer is denoted by $4_{m-1}$, the m-th recording layer is denoted by $4_m$, and the (m+1)-th recording layer is denoted by $4_{m+1}$. Similar denotation applies to the photochromic layer 6, the antireflection film 8, the optical waveguide layer 10, and the total reflection film 12 in each set structure. Reference numeral 14 denotes a protective film, and a transparent substrate is not shown. The transparent substrate is normally provided on the light beam irradiation side.

Each recording layer 4 is provided to record/reproduce information by using the first light beam 16 having a center wavelength $\lambda 1$. Each recording layer 4 has such a structure that information is recorded on a flat surface as in a compact disc. For example, in the case of using a phase-change film for recording information by phase change, each recording layer 4 includes not only a phase-change layer in which phase change is exhibited, but any layer required for recording and reproduction of information, such as a layer for protecting the phase-change layer and a layer for enhancing the effect of phase change. Further, in the case of recording information at an interfacial structure between layers having different refractive indices, a transparent layer is included as a part of the recording layer because this layer is also concerned with recording.

Each photochromic layer 6 becomes transparent to the first light beam 16 having the center wavelength $\lambda 1$ by irradiation with light or application of heat, and is increased in reflectance to the first light beam 16 by irradiation with a second light beam 18 having a center wavelength $\lambda 2$ different from the center wavelength $\lambda 1$. Each photochromic layer 6 is changed in molecular structure by irradiation with visible light, for example, causing a decrease in reflectance to become transparent. Thus, the increase and decrease in reflectance to the first light beam 16 can be repeated. The second light beam 18 is UV light, for example, and each photochromic layer 6 is changed again in molecular structure by irradiation with UV light to exhibit a coloring performance such that the reflectance to the light having the specific wavelength $\lambda 1$ is increased. Further, each photochromic layer 6 becomes transparent by irradiation with visible light, for example. Thus, each photochromic layer 6 is formed of a material which can be repeatedly made transparent and colored. For example, such a photochromic material may include fulgide and diaryl ethene. Preferably, each photochromic layer 6 is formed of a completely optical reversible photochromic material.

Each optical waveguide layer 10 is formed of Ge doped $SiO_2$, for example, transparent to the center wavelength $\lambda 1$ and the center wavelength $\lambda 2$. Each optical waveguide layer 10 has an inner circumferential end surface $10a$ formed as an inclined surface capable of introducing the second light beam 18 into the optical waveguide layer 10. The antireflection film or matching coat layer 18 is interposed between each optical waveguide layer 10 and each photochromic layer 6 to transmit both the first light beam 16 for recording/reproducing information to/from the recording layer 4 and the second light beam 18 for coloring the photochromic layer 6. With this structure, it is possible to suppress the total reflection of the second light beam 18 having the center wavelength $\lambda 2$ for coloring the photochromic layer 6 at the interface between the photochromic layer 6 and the optical waveguide layer 10, thereby allowing the irradiation of the photochromic layer 6 with the second light beam 18. Although a light beam 20 is shown so as to zigzag propagate in the optical waveguide layer 10 in FIG. 1, so as to conveniently show irregular reflection of the light beam 20, the propagation of the light beam 20 in the optical waveguide layer 10 is actually more precise or finer. That is, the light beam 20 propagates uniformly to thereby uniformly change the reflectance of the photochromic layer 6.

Further, the total reflection film 12 is interposed between the optical waveguide layer 10 and the recording layer 4 to transmit the first light beam 16 for recording/reproducing information to/from the recording layer 4 and to reflect the second light beam 18 for increasing the reflectance of the photochromic layer 6. With this structure, the transmission of the light beam 20 propagating in the optical waveguide layer 10 to the recording layer 4 is suppressed. Letting n1, n2, and n3 denote the refractive indices of each optical waveguide layer 10, each recording layer 4, and each photochromic layer 6, respectively, it is preferable to satisfy the relation of n3 >n1 >n2. In the case that this relation is satisfied on the refractive indices of each optical waveguide layer 10, each recording layer 4, and each photochromic layer 6, total reflection by a difference between the refractive indices can be exhibited, so that the antireflection film 8 and the total reflection film 12 can be omitted. Conversely, in the case that the antireflection film 8 and the total reflection film 12 are provided, the above relation about the refractive indices is not necessarily required.

Figure 2:
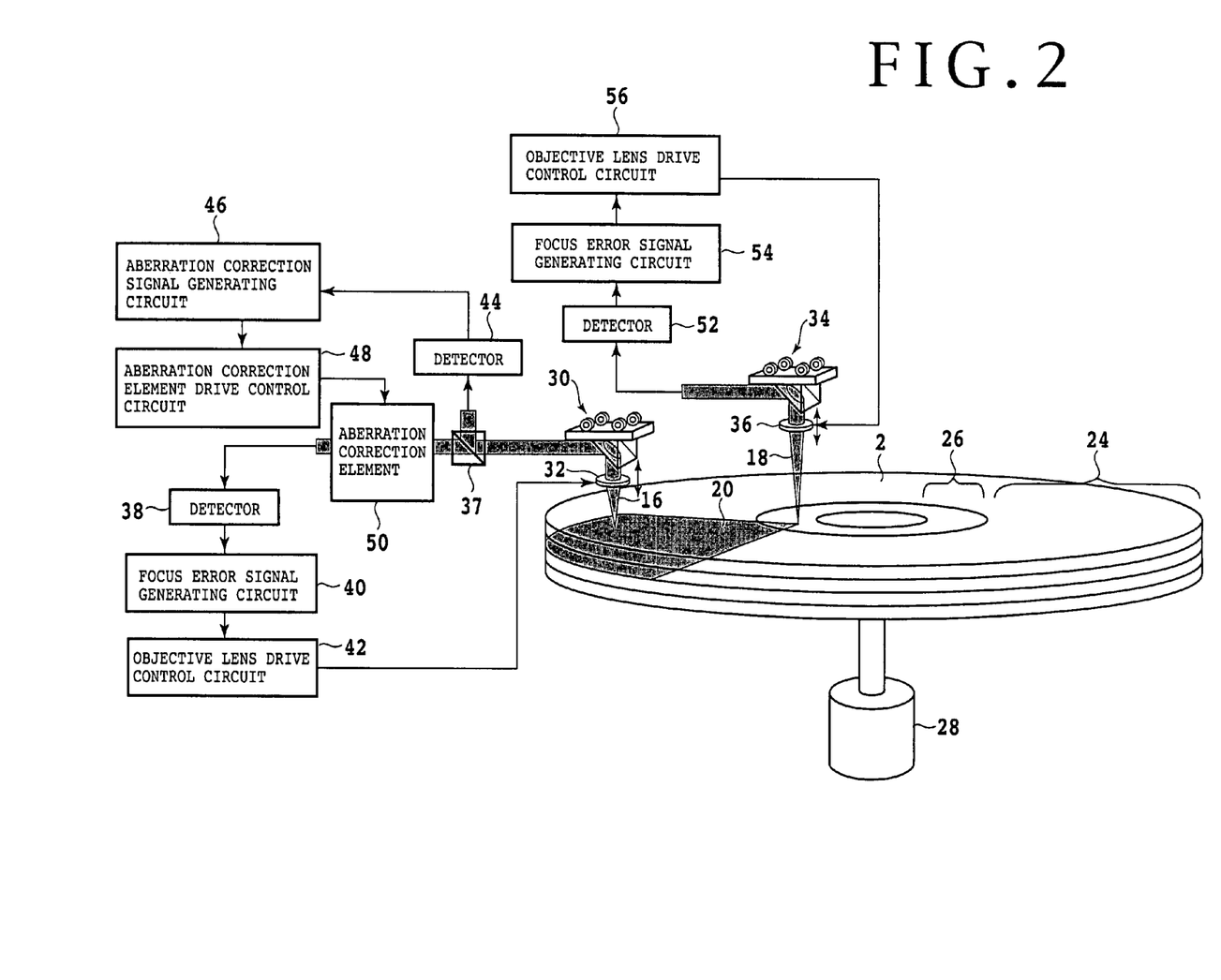
FIG. 2 is a schematic diagram of a recording/reproducing device for recording/reproducing information to/from the multilayer optical recording medium according to the first preferred embodiment.

Referring to FIG. 2, there is shown a schematic diagram of a recording/reproducing device suitable for use in recording/reproducing information to/from the multilayer optical recording medium 2 according to the first preferred embodiment shown in FIG. 1. The recording/reproducing device shown in FIG. 2 is a recording/reproducing device having a structure such that an optical head 30 for recording/reproducing information and an optical head 34 for selecting a recording layer are provided on the same side of the multilayer optical recording medium 2. The multilayer optical recording medium 2 has an information recording region 24 and a recording layer selecting region 26 formed radially inside of the information recording region 24. The recording medium 2 is rotated by a spindle motor 28.

The optical head 30 has an objective lens 32 whose focus is adjustable according to a focus error signal to direct the first light beam 16 having the center wavelength λ1 onto the multilayer optical recording medium 2, thus recording/reproducing information to/from the recording layer 4. The first light beam 16 is reflected on the recording layer 4. A part of the reflected light from the recording layer 4 is transmitted by a beam splitter 37, and is next detected by a photodetector 38. A focus error signal (FES) is generated according to an output from the photodetector 38 by a focus error signal generating circuit 40. The FES is input into an objective lens drive control circuit 42, which in turn adjusts the focal position of the objective lens 32.

The first light beam 16 directed from the optical head 30 exhibits spherical aberration due to a difference in optical distance from the objective lens 32 to each recording layer 4. Accordingly, the recording/reproducing device shown in FIG. 2 includes a spherical aberration removing mechanism having the following configuration. The remaining part of the reflected light from the recording layer 4 is reflected by the beam splitter 37, and is next detected by a photodetector 44. An output from the photodetector 44 is input into an aberration correction signal generating circuit 46 to generate an aberration correction signal. This aberration correction signal is input into an aberration correction element drive control circuit 48, which in turn drives an aberration correction element 50 to correct the spherical aberration. The aberration correction element 50 is inserted in an optical path between a light source such as a laser diode and the objective lens 32. The aberration correction element 50 is a device for correcting aberration in real time by using a liquid crystal, for example, and such a device is an existing technique.

Similarly, the optical head 34 has an objective lens 36 whose focus is adjustable according to a focus error signal. The second light beam 18 directed from the optical head 34 is reflected on the recording medium 2, and the reflected light from the recording medium 2 is detected by a photodetector 52. An output from the photodetector 52 is input into a focus error signal generating circuit 54 to generate a focus error signal (FES). This FES is next input into an objective lens drive control circuit 56, and the objective lens 36 is driven by an output from the objective lens drive control circuit 56, thereby adjusting the focal position of the objective lens 36.

Figure 3:
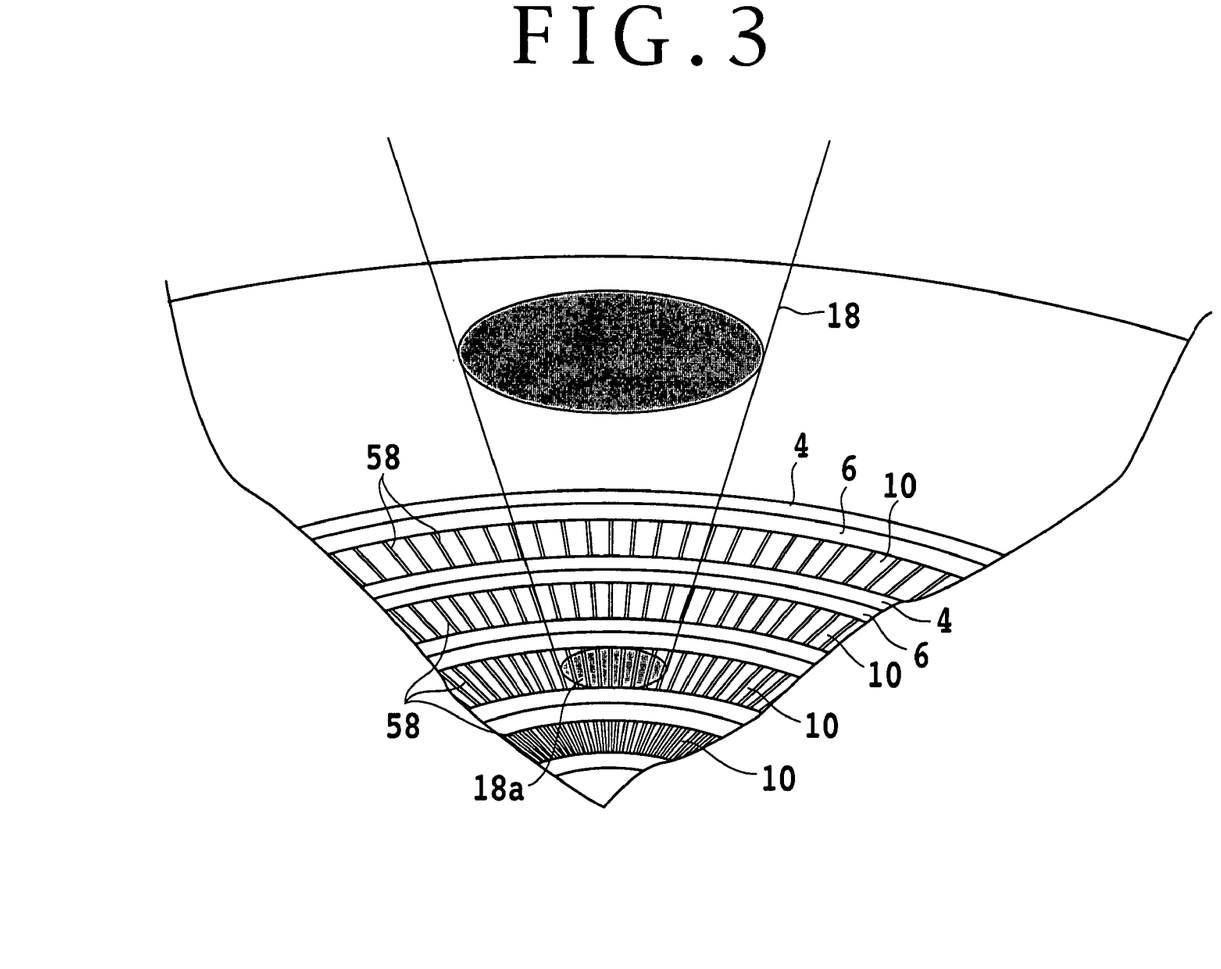
FIG. 3 is a schematic fragmentary view of a multilayer optical recording medium having gratings on the inner circumferential end surface of each optical waveguide layer.

FIG. 3 shows the shape of a beam spot 18a entering the end surface of each optical waveguide layer 10 and a plurality of gratings 58 formed on the end surface of each optical waveguide layer 10. These gratings 58 extend in the radial direction of the multilayer optical recording medium 2. As shown in FIG. 3, the beam spot 18a having an elliptical shape enters the end surface of each optical waveguide layer 10. This elliptical beam spot 18a can be realized by inserting a cylinder lens in an optical system, for example. The elliptical beam spot 18a can improve the uniformity of the circumferential width and intensity of the light beam 20 dispersively propagating in the optical waveguide layer 10. Further, by dispersing the light beam 20, it is possible to ensure the margin where the first light beam 16 from the optical head 30 enters the region of propagation of the second light beam 18. As shown in FIG. 3, the gratings 58 are formed on the end surface 10a of the optical waveguide layer 10 where the second light beam 18 from the optical head 34 enters. Accordingly, as compared with the case that the end surface 10a is flat, the light beam 20 can be dispersed more effectively in the optical waveguide layer 10 because of diffracted light by the gratings 58.

The operation of recording/reproducing information will now be described with reference to FIG. 1. In recording/reproducing information to/from a desired recording layer $4_m$, the second light beam 18 focused by the objective lens 36 of the optical head 34 enters the inner circumferential end surface 10a of the optical waveguide layer $10_m$ of the same set as that of the desired recording layer $4_m$. The light beam 18 introduced into the optical waveguide layer $10_m$ is irregularly reflected in the optical waveguide layer $10_m$ as shown by reference numeral 20, and dispersively propagates in the form of a sector toward the other end surface. When the photochromic layer $6_m$ is irradiated with the light beam 20 by the irregular reflection, the reflectance of the normally transparent photochromic layer $6_m$ to the light having a specific wavelength range including the center wavelength λ1 is increased.

On the other hand, the first light beam 16 having the center wavelength λ1 focused by the objective lens 32 of the optical head 30 is reflected on the photochromic layer 6m and returned to the optical head 30. Then, a focus error signal (FES) is generated by the focus error signal generating circuit 40 according to a part of the reflected light from the photochromic layer $6_m$, and the focal position of the objective lens 32 is adjusted by using known information on the spacing between the photochromic layer $6_m$ and the recording layer $4_m$. Thereafter, an aberration correction signal is generated by the aberration correction signal generating circuit 46 according to the remaining part of the reflected light from the photochromic layer $6_m$, and the aberration correction element 50 is driven according to this correction signal to correct for the aberration. The above-mentioned adjustment and correction are performed once or more to bring the focus on the recording layer $4_m$. Accordingly, information can be recorded/reproduced to/from the desired recording layer $4_m$ selected. There is no change in reflectance of the photochromic layers 6 on the upper side of the photochromic layer 6m whose reflectance has been changed above, so that the upper photochromic layers 6 remain transparent to transmit the first light beam 16, and the first light beam 16 can be focused on the recording layer $4_m$ corresponding to the optical waveguide layer $10_m$.

During recording/reproduction of information to/from the recording layer $4_m$ by the optical head 30, the second light beam 18 is directed continuously or in a pulsed manner to thereby maintain an increased reflectance of the photochromic layer $6m$. If the time of maintaining the increased reflectance of the photochromic layer $6_m$ is enough longer than the time of recording/reproducing information, the second light beam 18 may be directed during only the time of one revolution of the multilayer optical recording medium 2 and may be thereafter stopped to use only the first light beam 16 for writing/reading of information.

In the case of recording/reproducing information to/from the recording layer $4_{m-1}$ after the recording layer $4_m$, the reflectance of the photochromic layer $6_{m-1}$ may be increased similarly to allow recording/reproduction of information in accordance with the above procedure. However, in the case of recording/reproducing information to/from the recording layer $4_{m+1}$ after the recording layer $4_m$, there occurs a reduction in S/N in reading information due to an increase in reflectance of the photochromic layer $6_m$. To avoid this S/N reduction, the photochromic layer $6_m$ is irradiated with a light beam having a wavelength different from the wavelength of the first light beam 16, preferably, irradiated with a visible light beam, thereby restoring the transparent state of the photochromic layer $6_m$. Thereafter, the optical head 34 is moved to make the second light beam 18 enter the inner circumferential end surface 10a of the optical waveguide layer $10_{m+1}$ of the same set as that of the recording layer $4_{m+1}$. Accordingly, the reflectance of the photochromic layer $6_{m+1}$ of the same set as that of the recording layer $4_{m+1}$ can be increased to record/reproduce information to/from the recording layer $4_{m+1}$.

Figure 4:
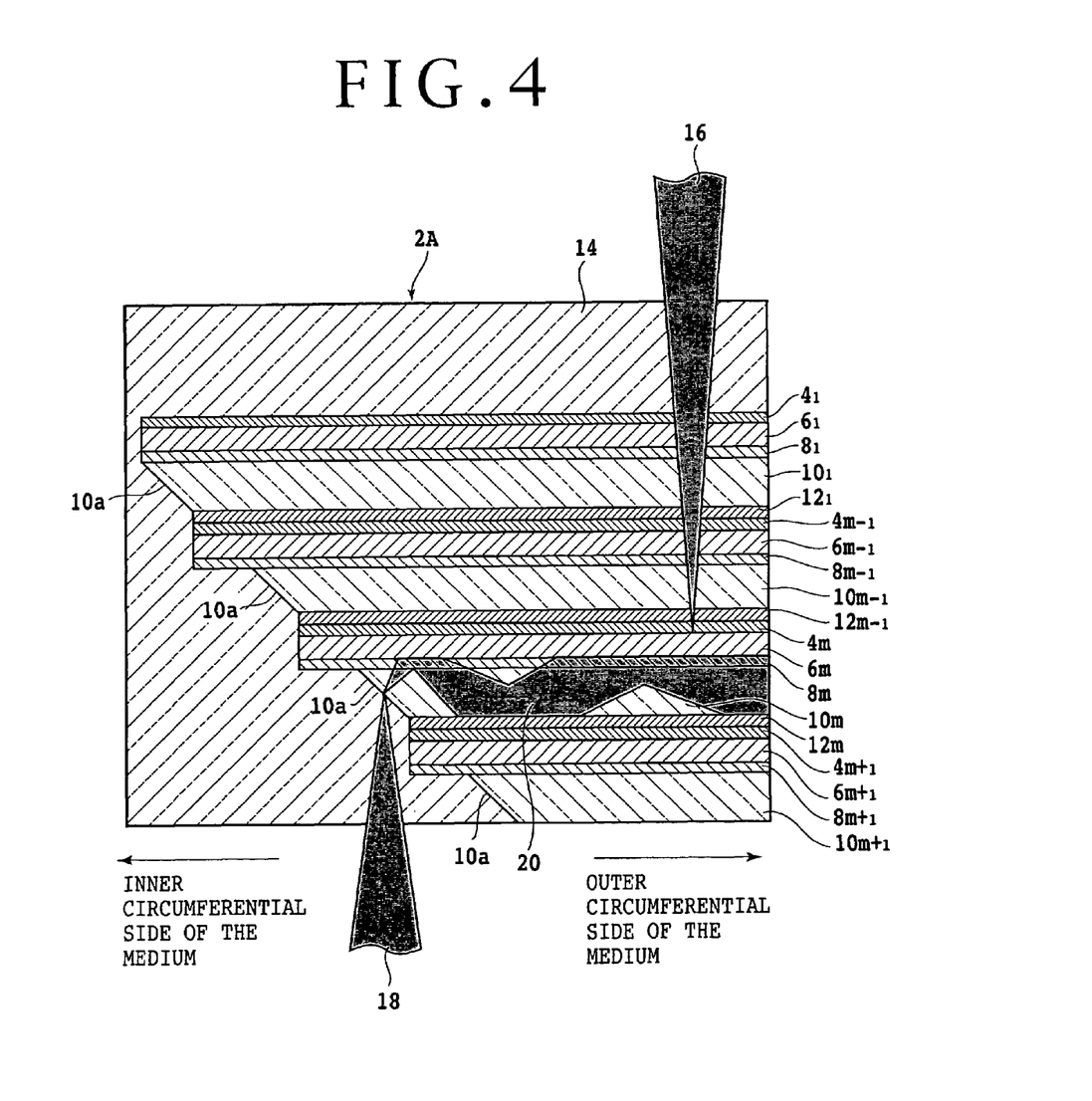
FIG. 4 is an enlarged sectional view of a multilayer optical recording medium according to a second preferred embodiment of the present invention.
Figure 5:
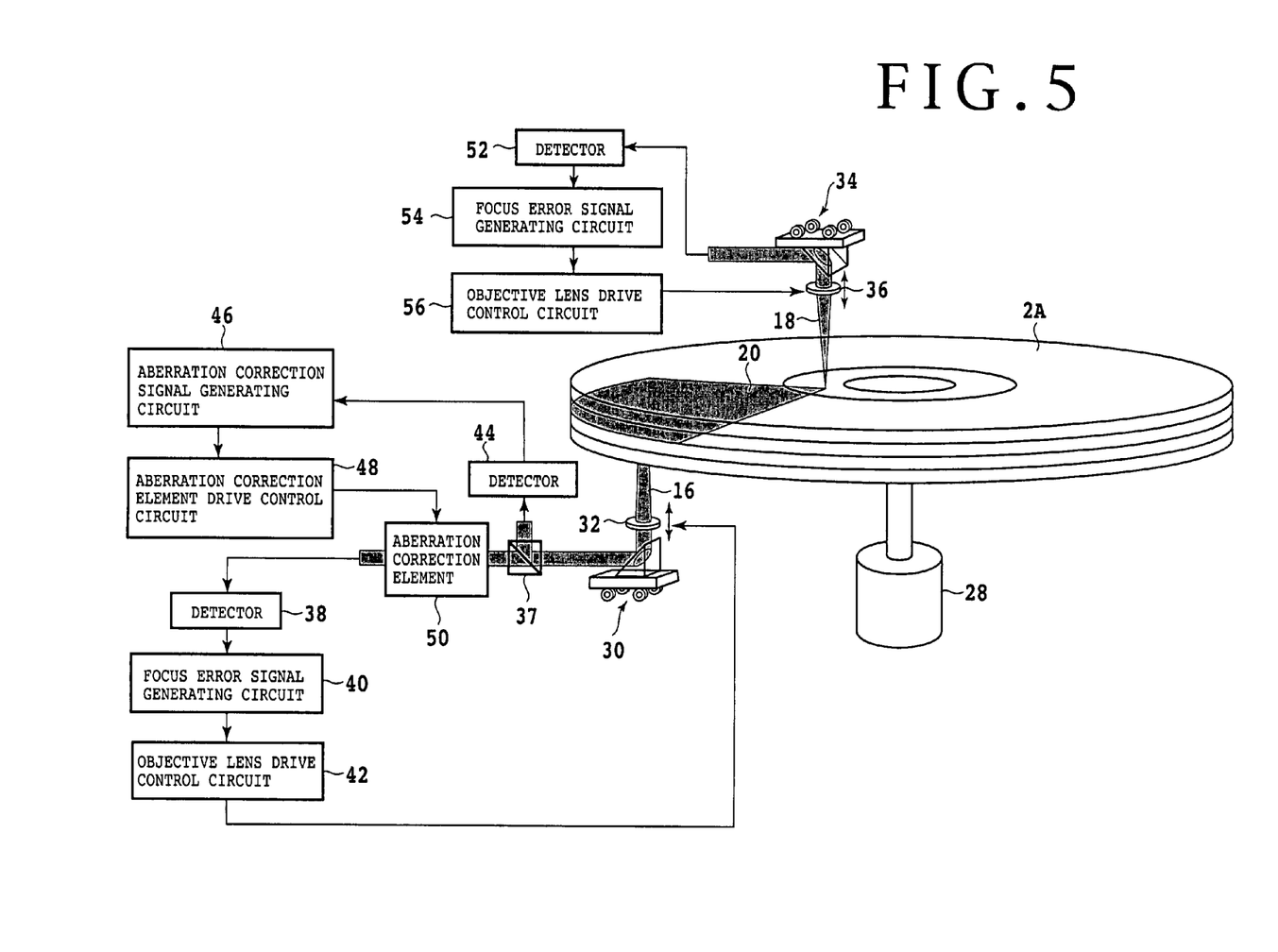
FIG. 5 is a schematic diagram of a recording/reproducing device for recording/reproducing information to/from the multilayer optical recording medium according to the second preferred embodiment.

Referring next to FIG. 4, there is shown an enlarged sectional view of a multilayer optical recording medium 2A according to a second preferred embodiment of the present invention. In this preferred embodiment, the first light beam 16 from the optical head 30 and the second light beam 18 from the optical head 34 are directed from the opposite sides of the multilayer optical recording medium 2A. The same parts as those of the multilayer optical recording medium 2 according to the first preferred embodiment shown in FIG. 1 are denoted by the same reference numerals. FIG. 5 shows a schematic diagram of a recording/reproducing device suitable for use in recording/reproducing information to/from the multilayer optical recording medium 2A shown in FIG. 4, wherein the optical head 30 and the optical head 34 are located on the opposite sides of the recording medium 2A. With this arrangement, stray lights due to the first and second light beams 16 and 18 in the recording/reproducing device can be isolated from each other, so that the stray light entering the optical head 30 can be reduced. Further, the movable optical heads 30 and 34 can be arranged without mutual interference.

Figure 6:
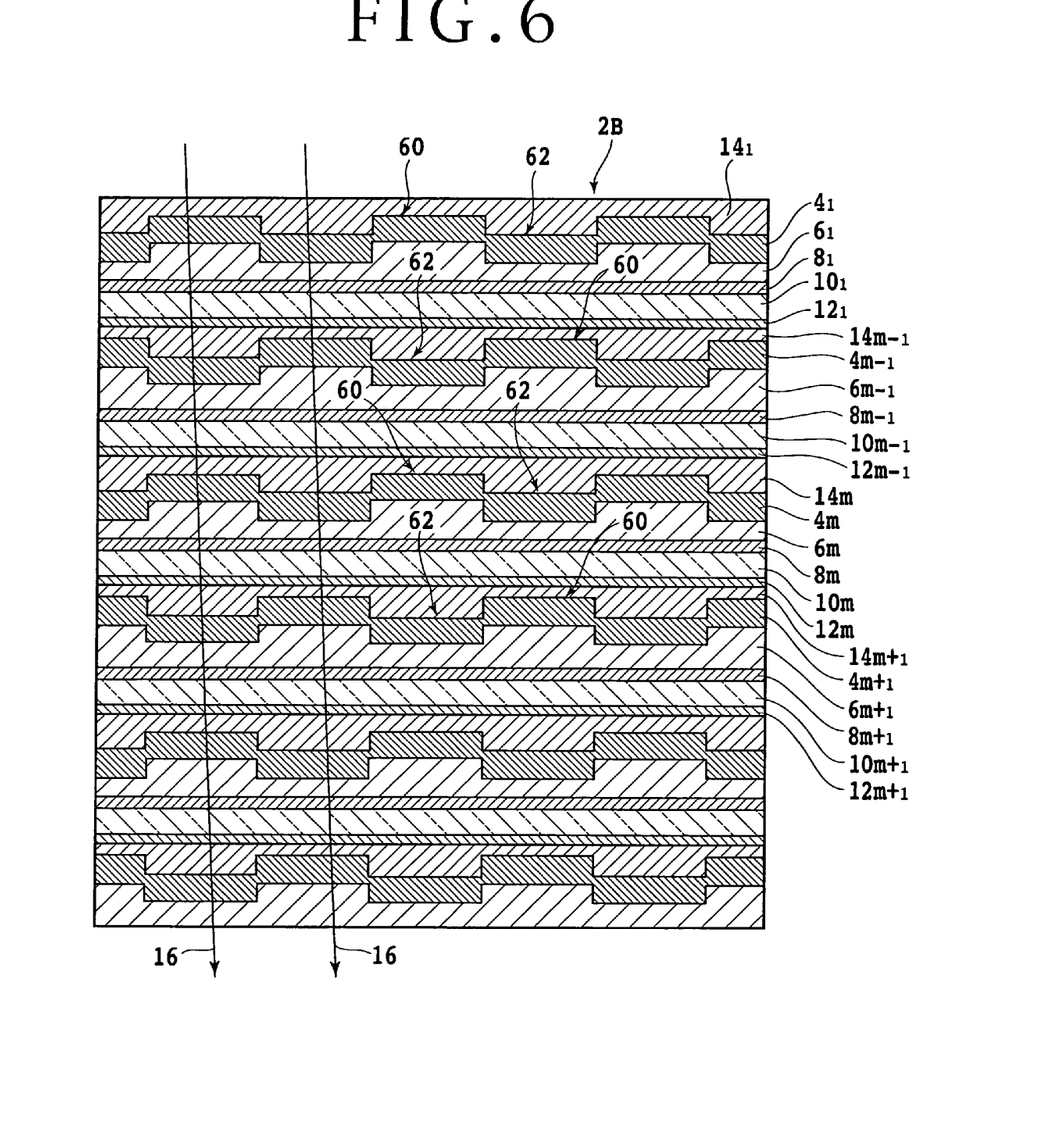
FIG. 6 is an enlarged sectional view of a multilayer optical recording medium having a land/groove structure.

In each of the multilayer optical recording media 2 and 2A according to the first and second preferred embodiments mentioned above, each recording layer 4 is flat as in a compact disc. In contrast thereto, FIG. 6 shows a sectional view of a preferred embodiment, wherein each recording layer 4 has a land/groove structure. In a DVD-ROM having two recording layers now in practical use, these recording layers are stacked in such a manner that the lands or grooves are formed at the same radial position. In a multilayer optical recording medium, however, the land/groove structure is realized by the boundary of materials having different refractive indices. Accordingly, an optical path difference due to the refractive index difference is generated between light beams passing through the land region and the groove region. This optical path difference is larger in a deeper recording layer, resulting in greater spherical aberration as compared with a flat recording layer at the same depth.

In the multilayer optical recording medium 2B shown in FIG. 6, a plurality of layers of land/groove structures are formed, wherein lands 60 are staggered and grooves 62 are also staggered. With this arrangement, it is possible to reduce the spherical aberration generated in recording/reproducing information to/from the deeper recording layer 4 by the first light beam 16 focused by the objective lens 32 of the optical head 30 as compared with a conventional medium such that the lands and grooves are not staggered. Such a plurality of layers of land/groove structures having a staggered arrangement of lands and grooves can be configured by making a protective layer $14_m$ have an adhesive function except the uppermost protective layer $14_1$.

In the multilayer optical recording medium 2B shown in FIG. 6, substantially the same parts as those of the first and second preferred embodiments are denoted by the same reference numerals. The multilayer optical recording medium 2B may be manufactured in the following manner. The odd-numbered set structures are formed by using a first stamper, and the even-numbered set structures are formed by using a second stamper. Thereafter, these odd-numbered and even-numbered set structures are alternately bonded by using the protective layers $14_m$ having an adhesive function. The land/groove structure in each set structure may be formed as a spiral structure of land/groove continuously extending from the inner circumference to the outer circumference of the medium.

Figure 7:
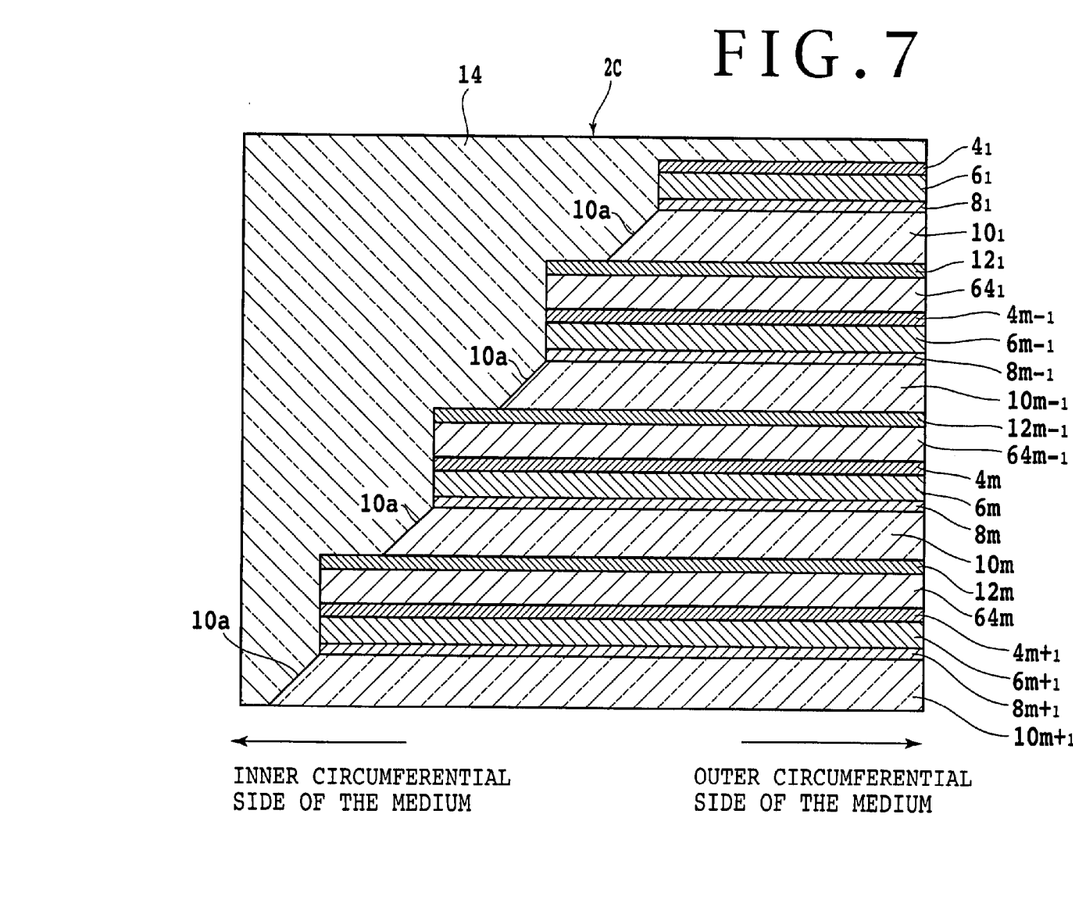
FIG. 7 is an enlarged sectional view of a multilayer optical recording medium including a plurality of set structures each having a recording layer, a photochromic layer, and an optical waveguide layer, wherein these plural set structures are bonded together by an adhesive.

Referring next to FIG. 7, there is shown an enlarged sectional view of a multilayer optical recording medium 2C according to a fourth preferred embodiment of the present invention. In the case of a multilayer optical recording medium, information is written/read to/from a plurality of recording layers independently. Accordingly, it is generally desirable to space the adjacent recording layers by a distance of 30 μm or more. The spacing between the adjacent recording layers 4 can be ensured by interposing a transparent material, e.g., a UV curing resin such as polycarbonate between the m-th optical waveguide layer $10_m$ and the (m+1)-th recording layer $4_{m+1}$. For example, a plurality of set structures each consisting of a recording layer 4, photochromic layer 6, antireflection film 8, optical waveguide layer 10, and total reflection film 12 are individually produced. In the final step, these set structures are bonded together by using an adhesive 64 as the UV curing resin mentioned above. Thus, mass production of the multilayer optical recording medium 2C can be attained. In this case, it is preferable to preliminarily record information on each recording layer 4 and use the multilayer optical recording medium 2C as a ROM.

Figure 8:
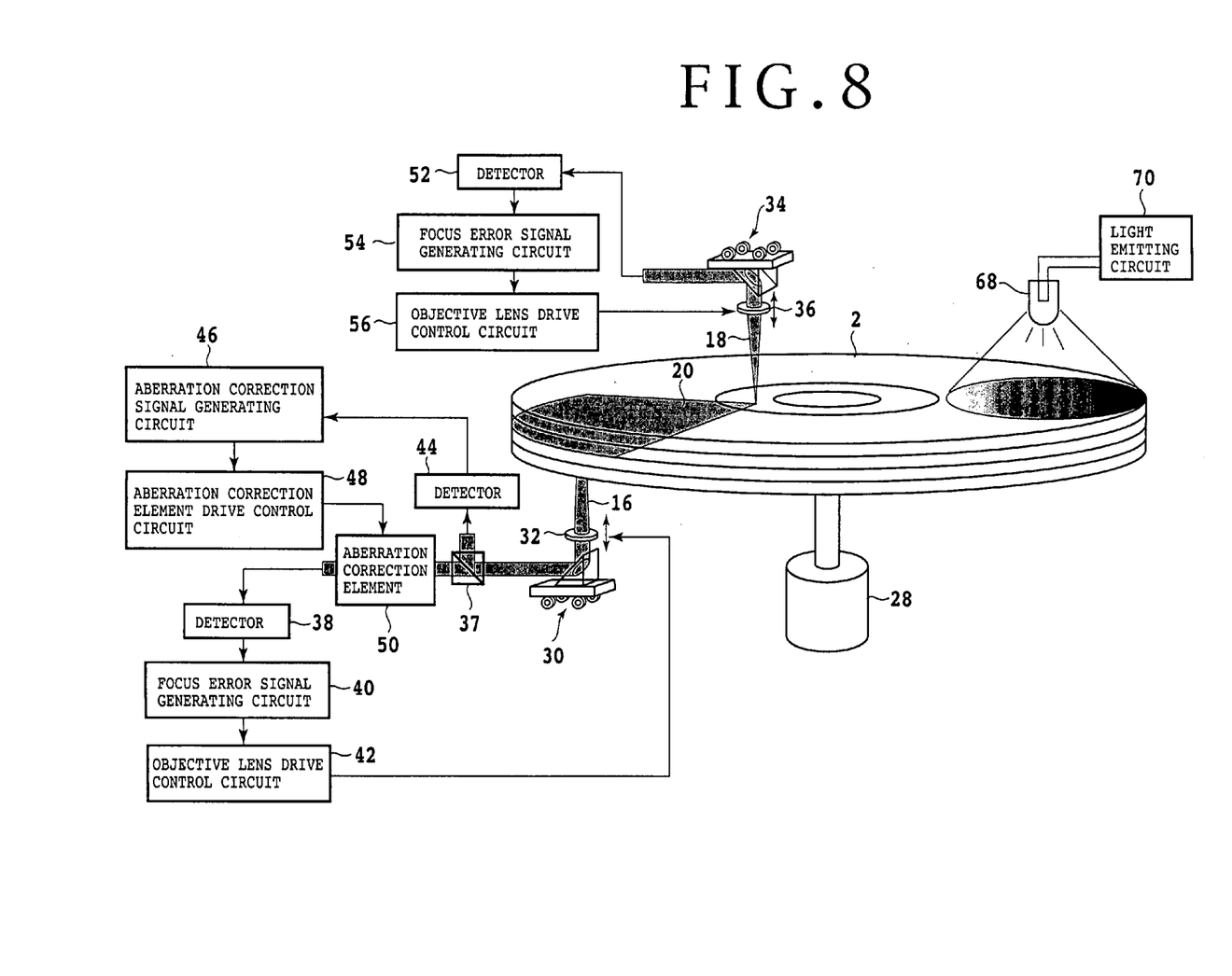
FIG. 8 is a schematic diagram of a recording/reproducing device having a mechanism for decolorizing the colored photochromic layer.

FIG. 8 shows a schematic diagram of a recording/reproducing device including a decolorizing mechanism (reflectance changing mechanism) for making transparent the colored photochromic layer 6 whose reflectance has been increased to restore an original low reflectance. In the case that the photochromic layer 6 is formed of a material retaining the color even after stopping the irradiation with the second light beam 18, the decolorizing mechanism functions to apply light and/or heat to the multilayer optical recording medium 2. For example, a white LED 68 connected to a light emitting circuit 70 is located outside the propagation region of the second light beam 18 for coloring the photochromic layer 6 to thereby decolorize the colored photochromic layer 6. While the position of the white LED 68 may be set on either side of the multilayer optical recording medium 2, the white LED 68 is preferably located on the side opposite to that of the optical head 30 to avoid the stray light. The decolorizing mechanism shown in FIG. 8 is adapted to decolorize all of the plural photochromic layers 6 in the medium 2. As a modification, the white LED 68 may be used as a light source for the optical head 34 to individually decolorize the photochromic layers 6.

In the conventional multilayer film, the multiple layers have different reflectances. To the contrary, the multilayer film according to the present invention has a fixed reflectance of each layer at a specific wavelength, so that reliable focusing can be attained without light quantity loss. Further, while the system of performing both the recording and the reproduction has been described in each preferred embodiment mentioned above, the present invention is applicable also to a system of performing either the recording only or the reproduction only. In this case, the optical head for recording/reproducing information is replaced by an optical head for recording information or an optical head for reproducing information.

As described above in detail, the multilayer optical recording medium of the present invention includes a plurality of set structures each consisting of a recording layer, a photochromic layer, and an optical waveguide layer stacked in this order from the irradiation side of a light beam for recording/reproducing information. Accordingly, a desired recording layer can be immediately identified and information can be recorded/reproduced to/from this recording layer identified. Only the information recorded in the recording layer focused by the light beam for recording/reproduction can be reproduced, so that the S/N of a reproduction signal can be improved. Further, the recording/reproducing device according to the present invention can be made compatible with a conventional recording/reproducing device using a normal optical recording medium having a fixed reflectance of each recording layer, thereby allowing writing or reading of information to/from such a normal optical recording medium.

What is claimed is:

1. A multilayer optical recording medium comprising:
   a first recording layer for recording or reproducing information by using a first light beam having a center wavelength $\lambda 1$;
   a first photochromic layer provided on said first recording layer;
   a first optical waveguide layer provided on said first photochromic layer for guiding to said first photochromic layer a second light beam having a center wavelength $\lambda 2$ different from said center wavelength $\lambda 1$;
   a second recording layer provided on said first optical waveguide layer for recording or reproducing information by using said first light beam;
   a second photochromic layer provided on said second recording layer; and
   a second optical waveguide layer provided on said second photochromic layer for guiding said second light beam to said second photochromic layer;
   wherein the reflectance of each of said first and second photochromic layers to said first light beam can be repeatedly increased by irradiation with said second light beam and can be repeatedly decreased by stoppage of said irradiation.

2. The multilayer optical recording medium according to claim 1, wherein each of said first and second optical waveguide layers has an inner circumferential end surface inclined to introduce said second light beam.

3. The multilayer optical recording medium according to claim 2, wherein said inner circumferential end surface of each of said first and second optical waveguide layers is formed with a plurality of gratings extending in the radial direction of said recording medium.

4. The multilayer optical recording medium according to claim 1, wherein the refractive index n1 of each of said first and second optical waveguide layers, the refractive index n2 of each of said first and second recording layers, and the refractive index n3 of each of said first and second photochromic layers satisfy the relation of n3>n1>n2.

5. The multilayer optical recording medium according to claim 1, further comprising:
   a first antireflection film interposed between said first photochromic layer and said first optical waveguide layer for transmitting said first and second light beams; and
   a second antireflection film interposed between said second photochromic layer and said second optical waveguide layer for transmitting said first and second light beams.

6. The multilayer optical recording medium according to claim 5, further comprising a total reflection film interposed between said first optical waveguide layer and said second recording layer for transmitting said first light beam and totally reflecting said second light beam.

7. A multilayer optical recording medium comprising:
   a first recording layer for recording or reproducing information by using a first light beam having a center wavelength $\lambda 1$;
   a first photochromic layer provided on said first recording layer;
   a first optical waveguide layer provided on said first photochromic layer for guiding to said first photochromic layer a second light beam having a center wavelength $\lambda 2$ different from said center wavelength $\lambda 1$;
   a first antireflection film interposed between said first photochromic layer and said first optical waveguide layer for transmitting said first and second light beams;
   a second recording layer provided on said first optical waveguide layer for recording or reproducing information by using said first light beam;
   a total reflection film interposed between said first optical waveguide layer and said second recording layer for transmitting said first light beam and totally reflecting said second light beam;
   a second photochromic layer provided on said second recording layer;
   a second optical waveguide layer provided on said second photochromic layer for guiding said second light beam to said second photochromic layer; and
   a second antireflection film interposed between said second photochromic layer and said second optical waveguide layer for transmitting said first and second light beams;
   wherein the reflectance of each of said first and second photochromic layers to said first light beam can be repeatedly increased by irradiation with said second light beam and can be repeatedly decreased by stoppage of said irradiation.

8. The multilayer optical recording medium according to claim 7, wherein each of said first and second optical waveguide layers has an inner circumferential end surface inclined to introduce said second light beam.

9. The multilayer optical recording medium according to claim 8, wherein said inner circumferential end surface of each of said first and second optical waveguide layers is formed with a plurality of gratings extending in the radial direction of said recording medium.

10. A storage device for recording and/or reproducing information to/from a multilayer optical recording medium including a plurality of set structures each consisting of a recording layer, a photochromic layer, and an optical waveguide layer stacked in this order from the irradiation side of a light beam for recording/reproducing information, said storage device comprising:

a rotating mechanism for rotating said multilayer optical recording medium;

a first optical head for directing a first light beam having a center wavelength $\lambda 1$ to said multilayer optical recording medium to record/reproduce information to/from an arbitrary one of said recording layers; and a second optical head for directing a second light beam having a center wavelength $\lambda 2$ different from said center wavelength $\lambda 1$ to a selected one of said optical waveguide layers;

said first optical head being located in a region where said second light beam directed from said second optical head propagates in said selected optical waveguide layer, wherein said first optical head has a first objective lens for focusing said first light beam on said arbitrary recording layer, and said second optical head has a second objective lens for focusing said second light beam on said selected optical waveguide layer, said storage device further comprising:

a first photodetector for detecting reflected light of said first light beam reflected on said photochromic layer whose reflectance has been increased by said second light beam propagating in said selected optical waveguide layer;

a first focus error signal generating circuit for generating a focus error signal for said first objective lens according to an output from said first photodetector;

a first objective lens driving circuit for driving said first objective lens according to an output from said first focus error signal generating circuit;

a second photodetector for detecting reflected light of said second light beam;

a second focus error signal generating circuit for generating a focus error signal for said second objective lens according to an output from said second photodetector; and a second objective lens driving circuit for driving said second objective lens according to an output from said second focus error signal generating circuit.

11. The storage device according to claim 10, further comprising:

a third photodetector for detecting reflected light of said first light beam;

an aberration correction signal generating circuit for generating an aberration correction signal for said first light beam according to an output from said third photodetector;

an aberration correction element inserted in an optical path of said first light beam for correcting aberration of said first light beam; and an aberration correction element driving circuit for driving said aberration correction element according to an output from said aberration correction signal generating circuit.

12. The storage device according to claim 10, further comprising a reflectance changing mechanism for reducing the increased reflectance of said photochromic layer attained by irradiation with said second light beam.

13. The storage device according to claim 12, wherein said reflectance changing mechanism comprises a white LED.

* * * * *